July 25, 1950     C. G. McLENDON     2,516,473
PEANUT VINE HARVESTER
Filed April 30, 1945     3 Sheets-Sheet 1
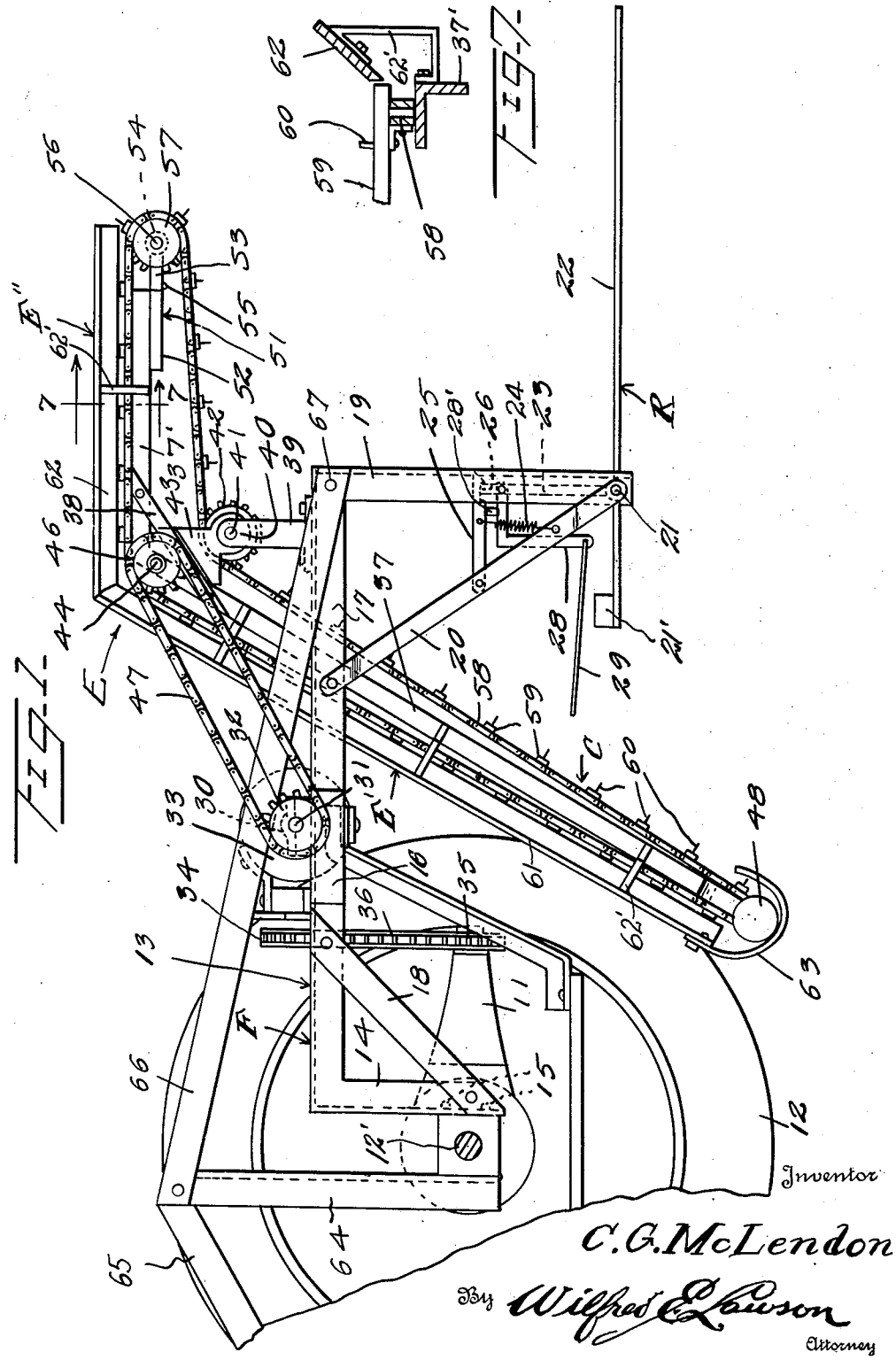
Inventor
C. G. McLendon
By Wilfred E. Lawson
Attorney

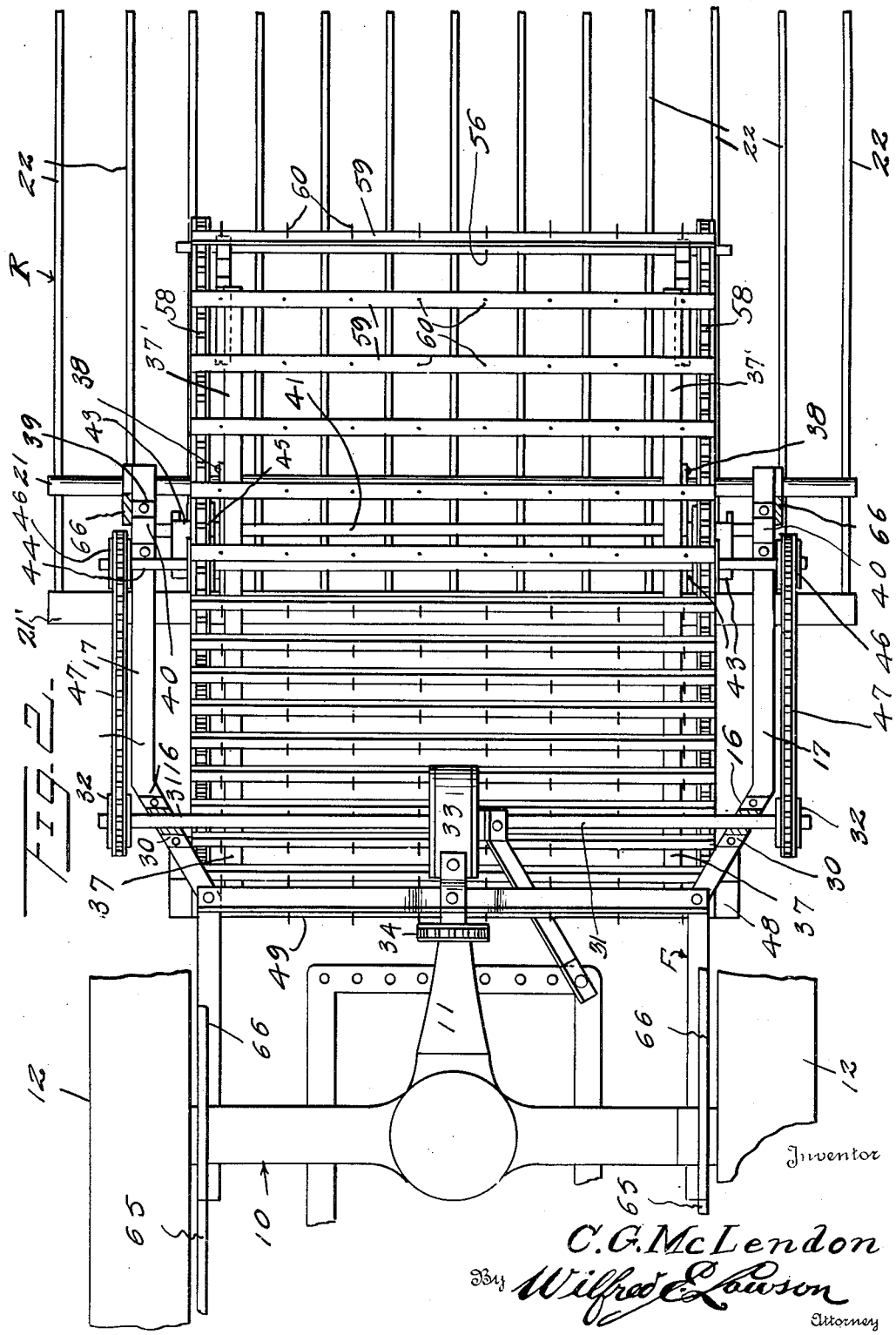

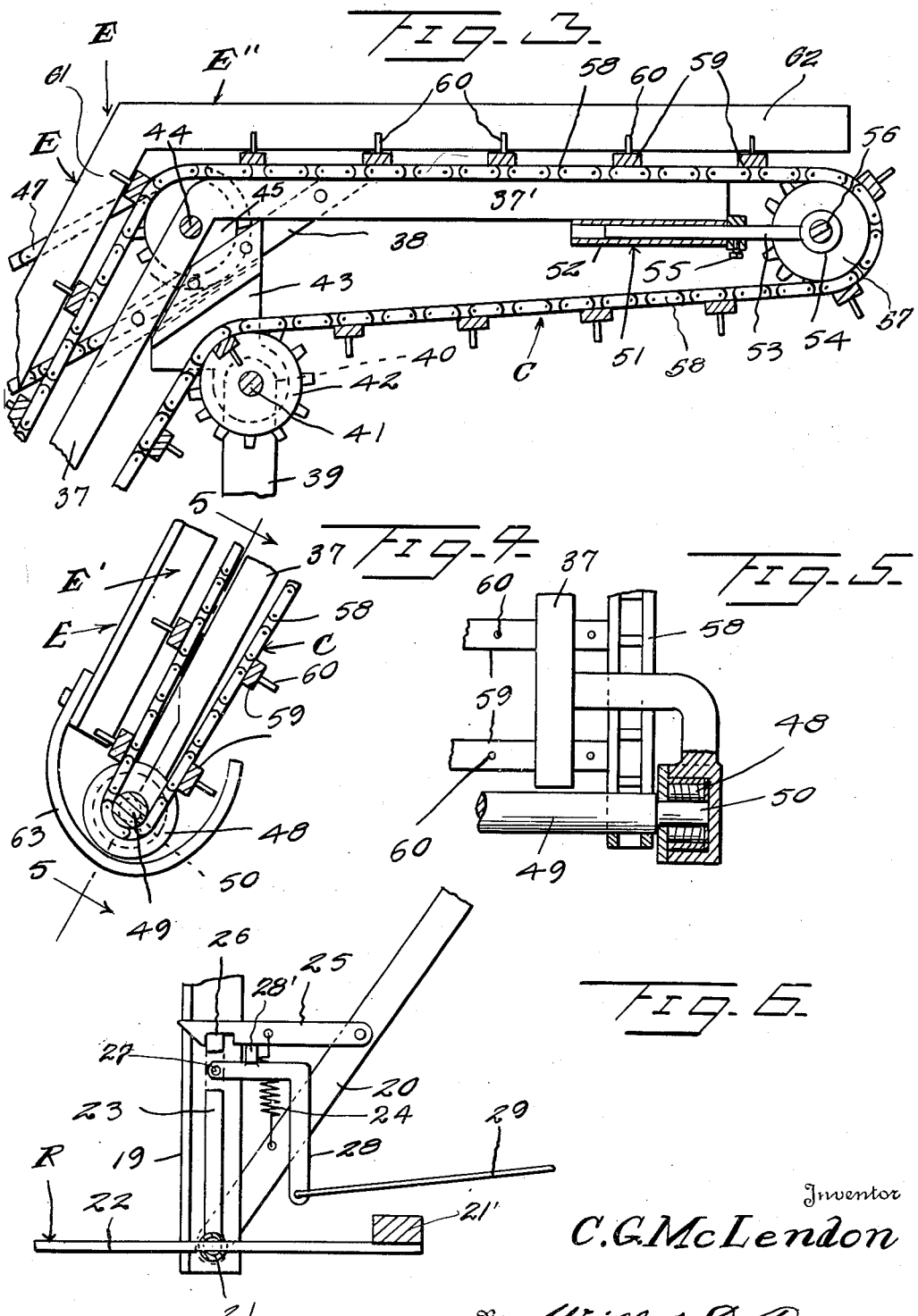

Patented July 25, 1950

2,516,473

UNITED STATES PATENT OFFICE 2,516,473

PEANUT VINE HARVESTER

Carlton G. McLendon, Dawson, Ga., assignor of one-half to Cleo T. Wills, Dawson, Ga.

Application April 30, 1945, Serial No. 591,005

1 Claim. (Cl. 56—27)

This invention relates generally to the class of harvesters and pertains particularly to an improved apparatus for gathering peanut vines together with the peanuts attached thereto.

A principal object of the present invention is to provide a harvester mechanism which is designed to be mounted upon the rear axle housing of a tractor or similar machine and to be operated directly from the usual rear power take-off unit, forming a part of such tractor.

Another object of the invention is to provide a harvester apparatus designed particularly for harvesting peanut vines after the plants have been removed from the ground, by gathering up such vines and depositing them upon a suitable rack mounted at the rear of the apparatus, which may be dumped at intervals under the control of the operator of the apparatus, so as to deposit the gathered or collected vines in piles or heaps where they may be stacked in the customary manner for drying.

Still another object of the invention is to provide in a harvester apparatus of the character stated, a novel endless conveyor elevator mechanism by means of which the vines may be quickly elevated to a desired level and then run off rearwardly along a short horizontal path for discharge onto an underlying pivotally mounted rack, such rack being designed to be readily released, at the will of the operator of the apparatus, so that the vines may be dumped at desired intervals.

Other objects and advantages of the invention will become apparent as the description of the same proceeds and the invention will be best understood from a consideration of the following detailed description taken in connection with the accompanying drawing forming a part of the specification, it being understood, however, that the invention is not confined to a strict conformity with the showing of the drawings but may be changed or modified so long as such changes or modifications mark no material departure from the salient features of the invention as expressed in the appended claim.

In the drawings:

Figure 1 is a view in side elevation of the harvesting mechanism embodying the present invention, showing the same applied to the rear portion of a tractor.

Figure 2 is a view in top plan of the structure shown in Figure 1, in which the conveyor side boards are removed.

Figure 3 is a view partially in longitudinal section and partially in elevation of a portion of the rear of the elevator structure.

Figure 4 is a detail section taken longitudinally of the lower end portion of the elevator structure.

Figure 5 is a sectional view on the line 5—5 of Figure 4.

Figure 6 is a detail view partly in section and with parts broken away, illustrating the rack holding latch mechanism.

Figure 7 is a sectional view taken on the line 7—7 of Figure 1.

Referring now more particularly to the drawings wherein like numerals of reference designate corresponding parts throughout the several views, the numeral 10 generally designates the rear axle housing of a tractor equipped, in the customary manner, with the rearwardly directed power take-off which is conventionally illustrated and designated 11.

The numeral 12 designates the rear tires for the tractor, the tires being mounted upon the usual rear wheels carried upon the rear axle 12'.

In accordance with the present invention there is mounted upon and supported by the rear axle housing, an elevated rearwardly extending frame, generally designated F, and comprising the two side rails 13 which are preferably formed of angle iron material of suitable weight but which, obviously, may be formed of any other suitable material. Each of these rails 13 has a right angularly extended forward end portion 14 which is bolted or otherwise suitably secured as indicated at 15, to the rear side of the axle housing, adjacent to the outer end thereof.

Each rail 13 extends rearwardly upon the inner side of a wheel and tire 12 and is then extended laterally through a portion of its length as indicated at 16, part way across the rear side of the adjacent tire after which it is continued rearwardly through the major portion of its length as indicated at 17.

Suitable braces 18 are placed across the angle between the horizontal and vertical portions of the rail at the forward end of each as shown while at its rearward end each rail of the frame has secured the rigid downwardly extending arm 19. These arms are braced by the upwardly and rearwardly extending brace bars 20 which are connected at their lower ends with the lower ends of the arms 19 and at their upper ends are joined to the adjacent portions 17 of the frame.

Extending transversely between and through the lower ends of the arms 19, and supported in suitable openings therein for turning movement, is a dump rack shaft 21 which forms a part of the dump rack structure generally designated R and comprising, in addition to the oscillatory shaft portion 21, a plurality of spaced parallel rods 22, each of which is secured to the shaft 21 and extends rearwardly therefrom in a horizontal plane, when the rack is in position to receive the peanut vines or plants.

The rear ends of the rods 22 are free so that when the rack is swung downwardly, these ends will approach the surface of the ground and the vines or plants which have been collected on the rack, may slide off smoothly onto the ground in a stack.

Forwardly of the shaft 21 the rods 22 are counterbalanced by a suitable weight 21'.

At one end of the shaft 21, the shaft has secured thereto the rigid upstanding lever 23.

Pivotally supported on a brace bar 20 adjacent to the lever 23, is the latch bolt 25, the notched or hooked portion 26 of which receives the top end of the lever 23 to hold the rack against downward swinging from horizontal position. This latch 25 is yieldingly pulled down by a spring 24.

Pivotally mounted at 27 adjacent to the forward end of the latch bolt 25, is an actuator in the form of a bell crank 28, one end of which engages the underside of the latch 25 through the medium of the upstanding stud 28' while the other end is connected with a pull rod 29 which extends forwardly to a position where it may be operated by the operator of the tractor when it is desired to release the rack for dumping.

Adjacent to the forward end of the frame F, the frame rails 13 support bearings 30 and each of these bearings has extended therethrough the outer end of one of the two aligned power transmitting shafts 31, each shaft at its outer end supporting a sprocket gear 32.

The inner ends of the shafts 31 are connected with the ring gear and pinions of a differential unit which is generally designated 33 and with this unit is connected by means of the sprocket gears 34 and 35 and the sprocket chain 36, the power take-off 11 of the tractor upon which the harvesting apparatus is mounted.

Supported between the rear portions 17 of the side rails of the frame F is an elevator unit which is generally designated E.

The elevator E comprises an upwardly and rearwardly inclined section generally designated E', and an upper rearwardly extending horizontal section E''. Comprised in this structure are the spaced parallel upwardly and rearwardly inclined conveyor frame beams 37 each of which joins at its upper end a shorter horizontally disposed beam 37' and these beams are braced across the angle which they form at their joined ends by the brace member 38.

Supported upon the rear end of each frame rail portion 17 is a vertical bearing standard 39, the upper end of which is formed to provide a bearing 40. Extending transversely of the frame F and having its ends extended through the bearings 40 of the two standards 39, is an idler shaft 41 which supports, between the bearings 40, the pair of sprocket wheels 42.

Upon the inner side of each of the bearings 40 the shaft 41 has pivotally supported thereon an upstanding bracket plate 43 and each of these bracket plates is secured to the elevator conveyor frame beams in the angles formed by the portions 37 and 37'. Thus the upwardly and rearwardly inclined portion E' of the elevator passes between the side rails of the frame F and the horizontal portion E'' of the elevator, extends horizontally rearwardly beyond the ends of the frame rails and terminates above the rack structure R.

Extending transversely between the upper ends of the frame beams 37 is the driven shaft 44. This shaft carries adjacent to the outer side of each of the beams 37', the sprocket gears 45 and upon its outer ends it carries corresponding sprocket gears 46. The gears 46 are in driving connection with the adjacent sprocket gears 32, by means of the sprocket chains 47. Through the medium of these chains 47, driving power is transmitted from the differential unit 33 to the driven shaft 44 with which the endless conveyor of the elevator, hereinafter described, is operatively connected.

The lower ends of the elevator frame beams 37 are in relatively close proximity to the ground and each carries a roller bearing unit 48. Between these roller bearing units 48 is disposed the roller 49, at each end of which is a suitable trunnion or stub shaft 50 which is mounted in the adjacent roller bearing.

At the free, rearwardly directed end of each horizontal frame beam 37' there is mounted a horizontally adjustable bearing unit which is generally designated 51 and which comprises a rearwardly opening tubular guide 52, an arm 53 which is slidably extended into the guide from the rear end, a bearing 54 carried upon the rear end of the arm, and an adjustment securing pin 55 which holds the arm 53 in outwardly or rearwardly adjusted position with respect to the guide 52.

Extending transversely of the elevator structure between the bearings 54 is the shaft 56, the ends of which are mounted in these bearings and this shaft carries a pair of sprocket gears 57.

The endless conveyor of the elevator structure is generally designated C and this comprises the two endless chains 58 and the cross connecting slats or bars 59 each of which carries a plurality of spikes 60.

Each endless chain passes around a sprocket gear 57 and around the roller 49 and between these two elements the upper run of the endless chain passes over the top of the adjacent driven sprocket gear 45 which is carried upon the driven shaft 44, while the lower run of the chain passes over the top of the adjacent idler sprocket gear 42.

It will be readily apparent that the tightness of the endless chains and, consequently, of the conveyor unit, may be readily controlled by the adjustment of the bearing arms 53.

The spikes 60 carried by the slats or bars 59 extend outwardly so that they will be directed forwardly and upwardly when the bars are moving along the top run of the conveyor and it will thus be apparent that the spikes will swing down and move or scrape across the surface of the earth as they move or pass under the roller 49 thereby picking up all of the peanut vines or plants and conveying them upwardly and then horizontally rearwardly for discharge from the rear end of the upper horizontal section of the elevator, onto the underlying rack R.

In order to prevent the vines or plants from escaping at the sides of the elevator there are provided the upwardly and rearwardly extending side boards 61 each of which joins, at its upper end, an end of a horizontal rearwardly extending side board 62. These boards may be mounted in any suitable manner as by attachment to the adjacent frame rails 13 or to the elevator frame beams 37 and 37' by means of brackets 62', as shown in Figure 7. It will be readily seen that each side board extends along a portion of the top run of an endless chain of the conveyor and thus the material carried by the conveyor will be retained in position on the slats, between the boards at the two sides of the conveyor.

At the lower end of each side board 61 there is secured one end of a downwardly curving roller bearing guard or fender 63. This guard passes downwardly below and curves upwardly behind the roller bearing and thus protects it from damage in the event that a solid obstruction such as a stone should be in the path of the bearing.

From the foregoing it will be readily apparent that there is provided in the present apparatus a novel means for picking up vines from the ground and lifting them rapidly to a desired elevation to be discharged directly downwardly onto a shiftable rack or platform from which such vines may be discharged at intervals, in piles or stacks, upon the ground. The apparatus is compact and readily attached to any suitable tractor having a power take-off unit with which the differential unit 33 may be operatively connected.

While any suitable bracing means may be employed for giving the desired support or rigidity to the rear ends of the rails of the frame F, a desirable bracing structure is here shown which comprises a pair of standards 64, each of which is secured to the rear axle housing and from the upper end of which extends the two brace beams 65 and 66. One of these beams such, for example, as the beam 65, is extended forwardly and downwardly for the attachment to a suitable fixed part of the tractor structure, not shown, while the other beam extends downwardly and rearwardly for attachment as at 67 to the extreme rear end of the adjacent side rail 13 of the frame F.

I claim:

Harvesting apparatus of the character described, comprising a frame adapted to be mounted upon the rear axle housing of a tractor and including spaced pairs of vertical members, means for securing each pair of members to the housing, relatively long rearwardly extending arms carried by each pair of members, the arms being joined together at their rear ends, a vertical bearing standard carried by the arms at opposite sides of the frame, each standard carrying two vertically spaced bearings, a pair of shafts extending transversely of the frame and each rotatably supported by two of said bearings whereby the shafts are vertically spaced, an elevator frame comprising spaced upwardly extending parallel side members and horizontally disposed rearwardly extending members each forming a continuation of a side member, the upwardly and rearwardly extending members being attached to the uppermost one of said shafts whereby the elevator frame is supported as a unit on said uppermost shaft for oscillation in a vertical plane, a pair of sprocket wheels supported upon each of said shafts, sprocket wheels rotatably supported at the rear ends of said rearwardly extending members for rotation on an axis extending transversely of the frame, a roller rotatably supported between the lower ends of the upwardly extending side members, an endless conveyor disposed within the elevator frame and including endless side chains passing around the last mentioned sprocket wheels and said roller, the upper flight of the endless chains passing over the sprocket wheels of the uppermost shaft and the lower flight of the endless chains passing over the sprocket wheels of the lowermost shaft, and means for transmitting driving power to the said uppermost one of the shafts.

CARLTON G. McLENDON.

REFERENCES CITED

The following references are of record in the file of this patent:

UNITED STATES PATENTS

| Number | Name | Date |
| --- | --- | --- |
| 892,298 | Myers | June 30, 1908 |
| 1,258,142 | Pitcher | Mar. 5, 1918 |
| 1,806,875 | Grafmiller | May 26, 1931 |
| 1,892,495 | Vorthmann | Dec. 27, 1932 |
| 2,151,289 | Warnke | Mar. 21, 1939 |
| 2,389,567 | Thornton | Nov. 20, 1945 |